US008321186B2

(12) United States Patent
Joshi

(10) Patent No.: US 8,321,186 B2
(45) Date of Patent: Nov. 27, 2012

(54) SYNTHETIC AIR TRAFFIC MANAGEMENT FAST-TIME ENVIRONMENT

(75) Inventor: Keith G Joshi, Melbourne (AU)

(73) Assignee: The Boeing Company, Chicago, IL (US)

( * ) Notice: Subject to any disclaimer, the term of this patent is extended or adjusted under 35 U.S.C. 154(b) by 1140 days.

(21) Appl. No.: 12/187,538

(22) Filed: Aug. 7, 2008

(65) Prior Publication Data

US 2010/0036651 A1 Feb. 11, 2010

(51) Int. Cl.
*G06G 7/48* (2006.01)
*G01S 7/40* (2006.01)
*G06F 19/00* (2011.01)

(52) U.S. Cl. .............................. 703/6; 342/169; 701/120

(58) Field of Classification Search .................. 703/2, 8, 703/6; 342/169; 701/120
See application file for complete search history.

(56) References Cited

U.S. PATENT DOCUMENTS 4,949,267 A 8/1990 Gerstenfeld et al.
6,053,737 A 4/2000 Babbitt et al.
6,421,603 B1 * 7/2002 Pratt et al. ..................... 701/528
7,145,504 B1 * 12/2006 Newberg et al. .............. 342/169
7,248,949 B2 * 7/2007 Love et al. ......................... 701/4
7,277,043 B2 * 10/2007 Arthur et al. .................... 342/29
7,801,502 B2 * 9/2010 Jaklitsch et al. ........... 455/226.1

OTHER PUBLICATIONS

PCT Intl Search Report and Wriiten Opinion for Application No. PCT/US2009/050425, dated Nov. 4, 2009, 12 pgs.
TAAM Reference Manual, Jeppesen, Chapter 9, Interoperability, Copyright 2008 Jeppesen, pp. 590-608.

* cited by examiner

*Primary Examiner* — Kandasamy Thangavelu
*Assistant Examiner* — Juan Ochoa
(74) *Attorney, Agent, or Firm* — Caven & Aghevli LLC

(57) ABSTRACT

Techniques for providing synthetic air traffic management in a fast-time environment are disclosed. In one embodiment, a method of providing a closed-loop air traffic management simulation gateway between a decision support tool (DST) and an airspace modeler includes receiving airspace simulation data from an airspace modeler. The airspace simulation may be converted to emulated radar signals at an update interval. The emulated radar signals may be transmitted to a decision support tool for analysis. A recommendation may be received from the decision support tool based on the emulated radar signals, which may be used to generate a synthetic actor response based on the recommendation. The synthetic actor may provide the response to the airspace modeler to enable updating the airspace simulation data. In this manner the design of more efficient airspace routes, arrival and departure routes and procedures may be more quickly achieved.

19 Claims, 6 Drawing Sheets

SYNTHETIC AIR TRAFFIC MANAGEMENT FAST-TIME ENVIRONMENT

TECHNICAL FIELD

The present disclosure is directed to air traffic management, and more specifically, is directed to methods and systems for providing a synthetic air traffic management fast-time environment for developing air traffic management systems.

BACKGROUND

Air traffic control is an important function to maintain operation of increasingly congested airspace. As airspace and airport activity increases, reliance on improved techniques for managing air traffic is necessary to maintain safe and efficient activity.

Decision support tools (DST) may be used to assist human operators (such as air traffic controllers, airline operators and pilots), who make many of the pertinent decisions to manage airspace and airport activity. For example, decision support tools may receive real-time airspace and airport activity data, analyze the data, and provide recommendations to the human controllers. The human operators may receive each recommendation and then implement the recommendation or a portion thereof, ignore the recommendation, or take another action during management of the airspace and airport activity.

Testing a DST may be an expensive and time consuming process. For example, a real-time test of a DST using human operators may require many months to complete and still may lack an ability to exhaustively test all possible scenarios of airspace and airport activity, thus making exhaustive testing impractical. Testing is an inherent part of the design process for the DST. The time and expense for conducting experiments using human operators limits the amount of data than can be collected to feed the design process of the DST.

SUMMARY

Embodiments of methods and systems for providing synthetic air traffic management in a fast-time (accelerated) environment are disclosed. Embodiments of methods and systems in accordance with the present disclosure may advantageously improve testing, analysis, design, operation, reliability, and related processes of air traffic management decision support tools. Airspace and procedure changes to current or proposed airspace route structures may be more quickly evaluated. The methods and systems provide improved and more efficient design of airspace routes, arrival and departure routes and procedures.

In one embodiment, a method of providing a closed-loop air traffic management simulation gateway between a decision support tool (DST) and an airspace modeler includes receiving airspace simulation data from the airspace modeler. The airspace simulation may be converted to emulated radar signals at an update interval. The emulated radar signals may be transmitted to a decision support tool for analysis. A recommendation may be received from the decision support tool based on the emulated radar signals, which may be used to generate a synthetic actor response based on the recommendation. The synthetic actor may provide the response to the airspace modeler to enable updating the airspace simulation data.

In another embodiment, a system providing an air traffic management fast-time environment (SAFE) includes a decision support tool (DST) interface to interact with a DST module. An airspace modeler module is provided, and a preferred airport and airspace modeler is "Total Airport and Airspace Modeler® (TAAM) available from Jeppesen Sanderson, Inc of Englewood, Colo. An interface may be included to interact with the TAAM module. A SAFE gateway may be included to facilitate communications between the DST module and the TAAM module. In addition, the SAFE gateway may include a radar emulator module and a synthetic actor module. The radar emulator module may convert data received from the TAAM interface into radar signals for transmission to the DST interface. The synthetic actor module may receive a recommendation from the DST interface and provide a response to the TAAM interface.

In a further embodiment, a method of providing a gateway between an airspace modeler and a decision support tool (DST) includes transmitting received output data from the airspace modeler to the DST. A recommendation may be received from the DST based on the received output data. A response may be generated based on the recommendation. The response may be transmitted to the airspace modeler.

The features, functions, and advantages can be achieved independently in various embodiments of the present disclosure or may be combined in yet other embodiments.

BRIEF DESCRIPTION OF THE DRAWINGS

Embodiments of systems and methods in accordance with the present disclosure are described in detail below with reference to the following drawings.

DETAILED DESCRIPTION

Methods and systems for providing a synthetic air traffic management fast-time environment are described herein. Many specific details of certain embodiments of the disclosure are set forth in the following description and in FIGS. 1 through 6 to provide a thorough understanding of such embodiments. One skilled in the art, however, will understand that the present disclosure may have additional embodiments, or that the present disclosure may be practiced without several of the details described in the following description.

Figure 1:
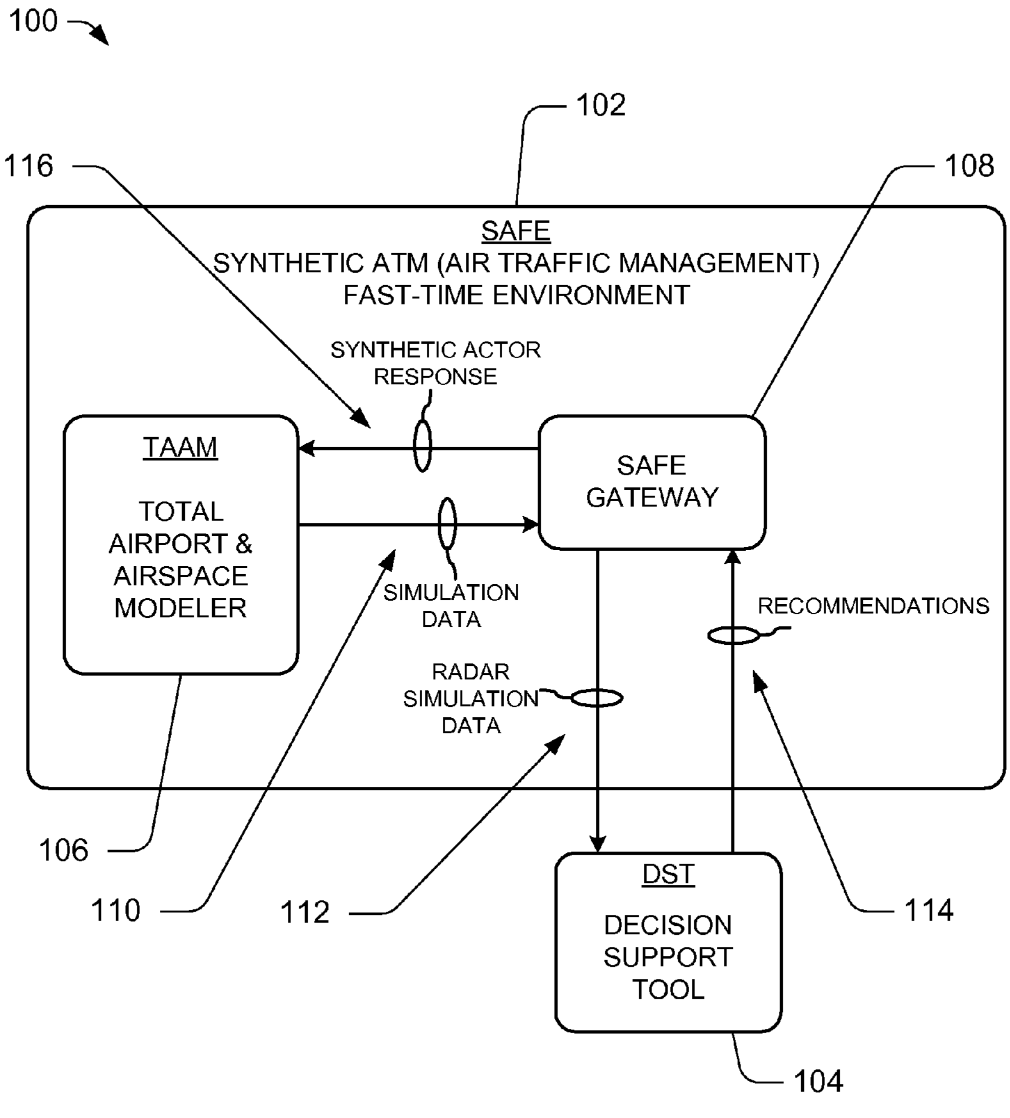
FIG. 1 shows a schematic of a synthetic air traffic management fast-time environment in accordance with an embodiment of the disclosure.

FIG. 1 shows a schematic of a synthetic air traffic management fast-time environment 100 in accordance with an embodiment of the disclosure. The environment 100 may include a synthetic ATM (air traffic management) fast-time environment 102 (or simply "SAFE") and a decision support tool (DST) 104. The DST 104 may be any tool, set of computer instructions, and the like for receiving airspace activity data, and transmitting a recommendation for operation in the received airspace. As used herein, any reference to airspace may also include airport activity. In an example, the DST 104 may receive radar signals of aircraft in a defined region. The DST 104 may analyze the radar signals and generate efficient routing for the aircraft based on various factors, such as trajectory of aircraft, prioritization rules, and so forth. When used effectively, a DST 104 may enable realization of increased airspace and airport efficiency and capacity.

In one or more embodiments, the SAFE 102 may include an airspace modeler 106 and a SAFE gateway 108. In some embodiments, the airspace modeler 106 is a "Total Airport and Airspace Modeler®" (TAAM) available from Jeppesen Sanderson, Inc of Englewood, Colo. The 106 may provide a simulation of real-world airspace and/or airport activity to model traffic behavior in an air traffic management (ATM) system. For example, the TAAM 106 may be a customizable application which can simulate complex operations of inter-related interactions of aircraft, airports, air traffic controller instructions, and other relevant data.

The TAAM 106 may receive inputs from various sources, such as human analysts, control systems (e.g., the SAFE gateway 108, etc.), and so forth. The inputs may include initial parameters which control the output of the TAAM 106. For example, inputs may enable an analyst to operate TAAM 106 to provide exhaustive scenarios to test rare and rare-normal cases. The TAAM 106 may enable testing stress simulations of an ATM system. Other inputs may include simulated or real human input, such as aircraft operational decisions which include rerouting aircraft. The TAAM 106 may implement the received inputs to create, update, and maintain the airspace and airport simulation. In some embodiments, the TAAM 106 may periodically output a location (e.g., latitude, longitude, trajectory, etc.) and time for each object (e.g., aircraft, etc.) in the model. In accordance with some embodiments, the TAAM 106 may create a simulation which can be used to provide data to the DST 104, such that the DST operates as if it were in communication with a real-world ATM environment.

In accordance with some embodiments, the SAFE gateway 108 provides an interface between the TAAM 106 and the DST 104, among other functions performed by the SAFE gateway. Simulation data 110 may be transmitted from the TAAM 106 to the SAFE gateway 108. The SAFE gateway 108 may convert the simulation data 110 into radar simulation data 112, which may be transmitted to the DST 104. From the DST 104, the radar simulation data may be indistinguishable from real-world radar data. The DST may provide recommendations 114 to the SAFE gateway 108 based on the radar simulation data 112 and other factors (e.g., protocol, decision tools, etc.). The SAFE gateway 108 may selectively implement the recommendations 114 to create a synthetic actor response 116, which may be transmitted to the TAAM 106.

The SAFE gateway 108 facilitates a closed-loop cycle including data which is transmitted from the TAAM 106 and the DST 104. In some embodiments, a user (e.g., an analyst, an evaluator, etc.) may configure the SAFE gateway 108 and initiate operation of the SAFE gateway. Accordingly, the SAFE gateway 108 may enable testing, analysis, design, operation simulation, reliability checking, and related processes of the DST 104 in communication to the TAAM 106. For example, the DST 104 may be evaluated for basic operation, for parameters of the DST system including DST specific parameters and parameters implemented via the SAFE gateway 108, integration of the DST in the ATM system, and testing an overall viability of the entire system when implemented with a human component. The SAFE gateway 108, as implemented, may automate software testing to enable faster and more robust software development which may improve operation, reliability, and other aspects of the DST 104.

Figure 2:
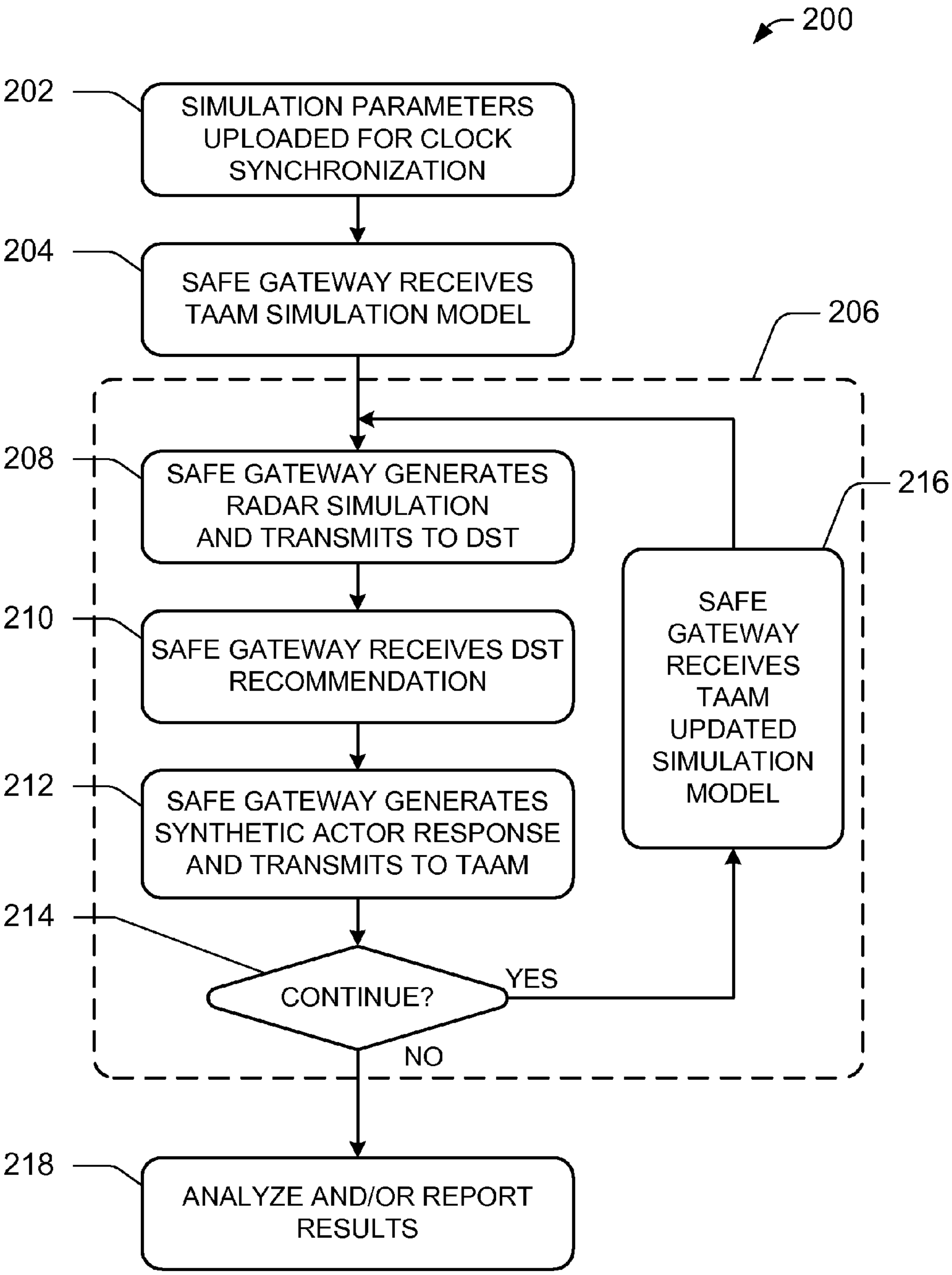
FIG. 2 is a flow diagram of an illustrative process for running a simulation using a synthetic air traffic management fast-time model in accordance with another embodiment of the disclosure.

FIG. 2 is a flow diagram of an illustrative process 200 for running a simulation using a synthetic air traffic management fast-time model in accordance with another embodiment of the disclosure. The process 200 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to the process 200, shall be interpreted accordingly.

As shown in FIG. 2, at 202, simulation parameters may be uploaded for clock synchronization. The clock synchronization may enable running the synthetic air traffic management in fast-time, as opposed to real-time. For example, a scenario may be executed in fast-time in a fraction of the real-time, such as a 24-hour real-time scenario run in 30 seconds in fast-time, among other possible accelerated time rates. The clock synchronization may be controlled by the TAAM 106, the DST 104, the SAFE gateway 108, or another separate component within the environment 100 of FIG. 1. Fast-time automation combined with the configurability of parameters allows testing of a much wider range of scenarios. The fast-time capability resulting from the clock synchronization may also enable generation of large data volumes, which may result in more extensive trade studies that can be performed on the DST's parameters, allowing the DST 104 to be optimized for a proposed deployment.

At 204, the SAFE gateway 108 receives the TAAM 106 simulation model. The TAAM simulation model may be transmitted to the SAFE gateway 108 via a wired or wireless connection. For example, the TAAM 106 may reside in a remote server which transmits packets of data, including location representations for aircraft, to a server hosting the SAFE gateway 108. At 206, a closed-loop cycle is initiated to process the TAAM simulation model from the operation 204 based on the clock synchronization at the operation 202.

The closed-loop cycle at 206 includes a number of processes which describe interactions between at least the TAAM 106, the DST 104, and the SAFE gateway 108. At 208, the SAFE gateway 108 generates a radar simulation and transmits the radar simulation to the DST 104. The radar simulation may be created by a radar emulator which converts the received data from the TAAM 106 into one or more radar signals which may be received, analyzed, and processed by the DST 104. At 210, the SAFE gateway 108 receives a DST recommendation. The DST 104 may create the recommendation based on the received radar signals based on predetermined logic integrated in the DST 104.

In accordance with some embodiments, at 212, the SAFE gateway 108 generates synthetic actor response and transmits the response to the TAAM 106. The basic function of the synthetic actor is to convert the DST recommendation into response action (an acceptance of the recommendation or a portion thereof, a rejection, a request, and so forth) to be performed on the ATM model (i.e., the TAAM 106). The synthetic Actor component of the SAFE gateway 108 receives the decision recommendations and takes the role of a human operator. The synthetic actor responses may include latency (e.g., representing human processing and/or implementation time), predetermined decision protocol, and other aspects which model an actual human actor in a real-world environment. In some embodiments, the synthetic actor may include test logic such as to facilitate generating error cases.

At 214, the operation 206 includes a continue decision operation. Although the continue decision operation is shown in FIG. 2 as following the synthetic actor response transmission to the TAAM 106, the continuation decision at 214 may be located anywhere in the closed-loop operation 206, or in multiple locations within the closed-loop. If the continue decision operation is affirmative, at 216, the SAFE gateway 108 may receive the TAAM updated simulation model based on the synthetic actor response from the operation 212. The output of the operation 216 may continue to the operation 208 to continue the closed-loop operation 206. Alternatively, at 218, the closed-loop operation 206 may be terminated and/or results from the closed-loop operation may be analyzed and/or reported to evaluate the DST 104, or other components of the synthetic air traffic management fast-time environment. For example, the operation 218 may report the number of conflicts created in the TAAM 106 based on a parameters inputted into the SAFE gateway 108 for a particular implementation of the DST 104. The number of conflicts may then be compared to other data sets to determine the viability, adequacy, improvement options, or other information for the DST 104.

Figure 3:
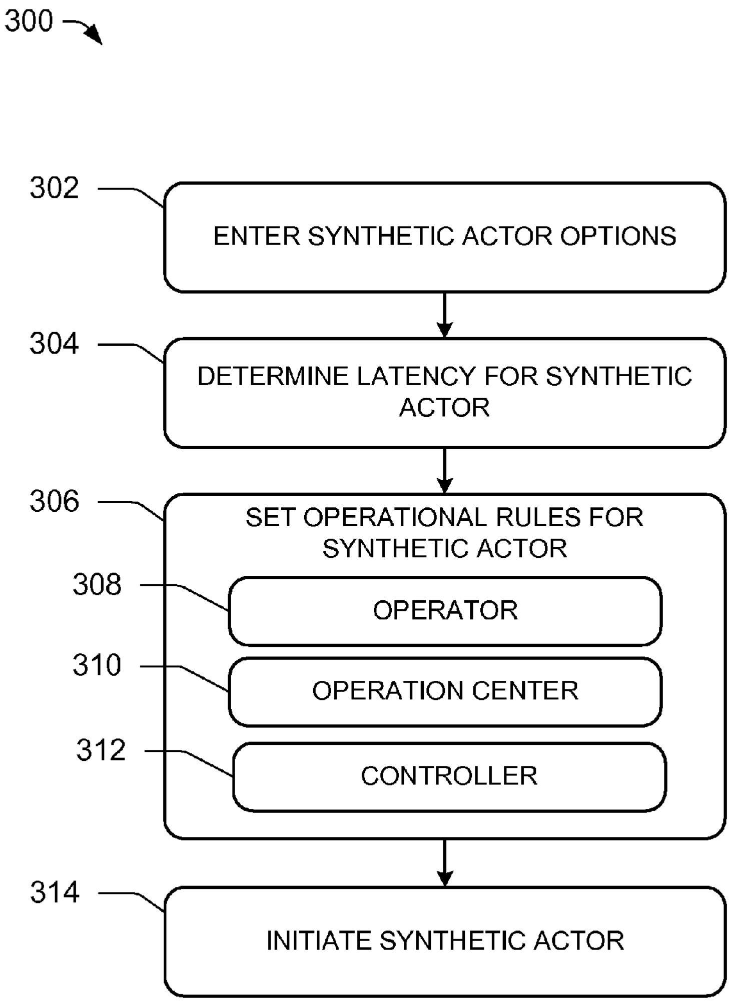
FIG. 3 shows a flow diagram of an illustrative process of providing a synthetic actor in accordance with yet another embodiment of the disclosure.

FIG. 3 shows a flow diagram of an illustrative process 300 of providing a synthetic actor in accordance with yet another embodiment of the disclosure. At 302, a user may enter a configuration interface for the synthetic actor. For example, the SAFE gateway 108 may include a user interface that allows an analyst to configure the synthetic actor by inputting or selecting various options.

At 304, a user may determine a latency for the synthetic actor. The latency may include one or more of a human response time, a human processing time, and an implementation time, among other possible latency periods. The latency may be fixed (e.g., same for each closed-loop cycle), random within a predetermined distribution (e.g., minimum and maximum time constraints may be set), or based on the situation such as the complexity of the recommendation from the DST 104 or the overall state of air traffic simulation. The effect of latencies on the performance of the DST 104 may be helpful in analyzing the effectiveness of the DST. For example, latencies may provide insight as to when recommendations from the DST 104 are stale, or otherwise untimely, and cannot be implemented in the ATM model. With latencies, the SAFE gateway 108 may support a parametric study that is conducted on such latencies, providing an analysis of the affects of latencies. Existing technology using human-in-the-loop would only demonstrate the feasibility of the system with the latencies experienced in a handful of scenarios.

In accordance with some embodiments, at 306, a user may select a set of operational rules for the synthetic actor. The set of operational rules may be selectively based on sub-operations 308, 310, and 312. At 308, operator rules may be determined and/or selected to provide a simulation of an aircraft pilot or other vehicle operator (e.g., airport ground transport, etc.). At 310, operation center rules may be determined for a control center such as an airline control center or other non-air traffic control center which may make decisions which impact the ATM. At 312, an air traffic controller rules may be determined. In some instances, one of the operations 308, 310, and 312 may be implement, or a combination of the operations 308, 310, 312 may be implemented in the process 300. In some embodiments, each of the operations 308, 310, and 312 may include separate customizable inputs.

At 314, the synthetic actor inputs provided in the process 300 may be initiated. For example, an analyst may select a latency profile at the operation 304 and set operational rules for the synthetic actor at the operation 306. The operational rules then determine how the synthetic actor responds to recommendations received from the DST 104 when executed in the process 200, such as at the operation 212 where the SAFE gateway 108 generates the synthetic actor response.

Figure 4:
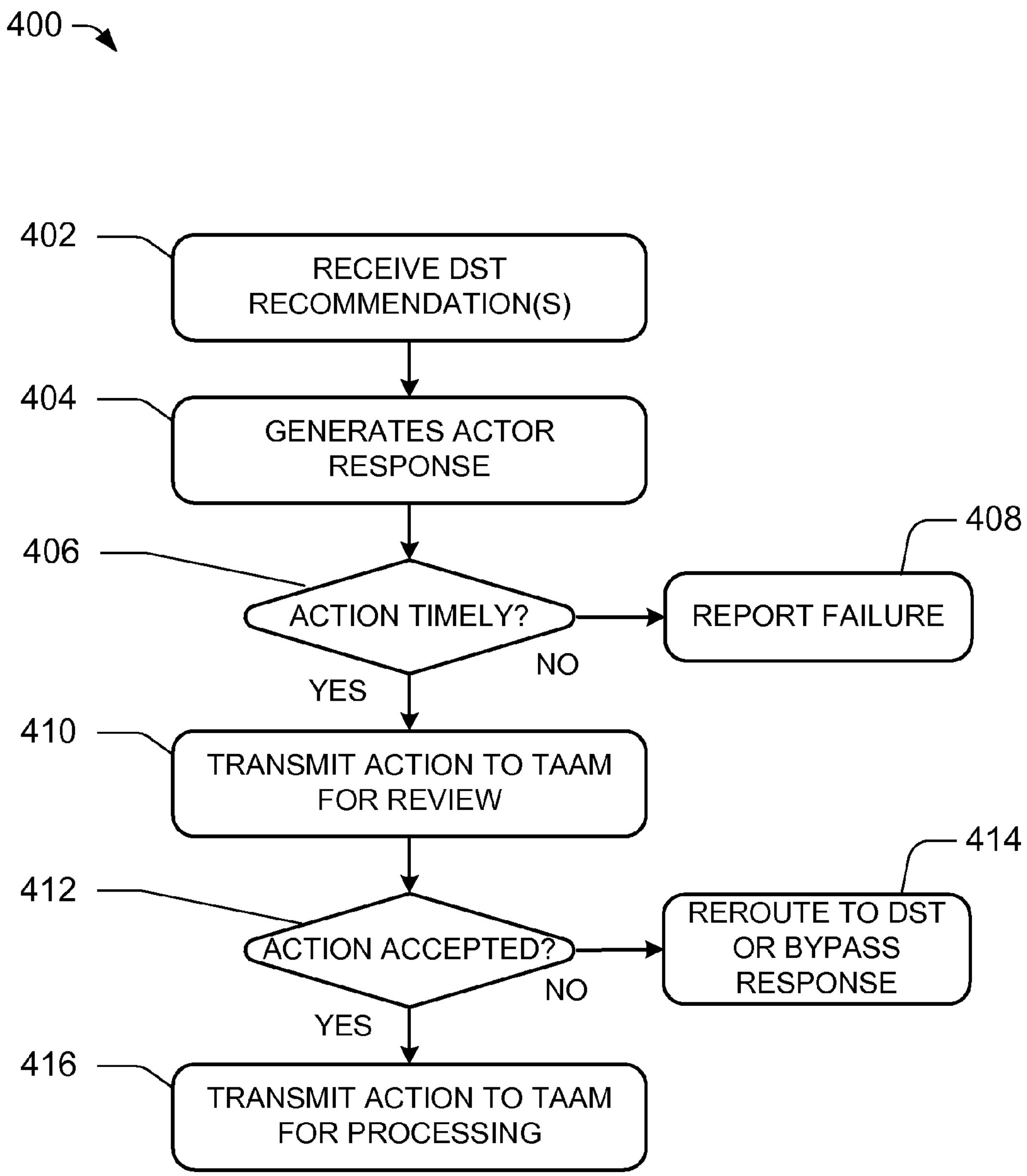
FIG. 4 is a flow diagram of an illustrative process of analyzing a response from the synthetic actor in accordance with an embodiment of the disclosure.

FIG. 4 is a flow diagram of an illustrative process 400 of analyzing a response from the synthetic actor in accordance with an embodiment of the disclosure. At 402, the synthetic actor of the SAFE gateway 108 receives the recommendations of the DST 104. At 404, the synthetic actor generates a response after a latency period. At 406, a decision operation determines whether the response by the synthetic actor is timely. If the latency period is too long, the recommendation from the DST 104 may become stale and no longer allow a response to be accepted by the ATM model. For example, an aircraft may have a brief window of opportunity to redirect its course before a conflict is created by the redirect, any efficiency gained is no longer achievable, or other reasons occur which make the recommendation stale. If the action is not timely at the decision operation 406, a failure report may be logged, outputted, or otherwise recorded at 408.

In some embodiments, at 410, the synthetic actor response may be transmitted to the TAAM 106 for review. For example, the TAAM 106 may receive the response, determine the feasibility of the response, and then either allow, modify, or deny the response from the synthetic actor at the operation 410. At 412, a decision operation determines whether the TAAM 106 accepts the response. If the response is not accepted, the process 400 may be rerouted to the DST 104 at 414, the cycle may continue without a response, or other actions in accordance with embodiments of the disclosure may take place to continue the closed-loop cycle 206 of FIG. 2. If the response is accepted, at 416, the action is transmitted to the TAAM 106 for processing. Thus, the TAAM 106 may continue the simulation by making any necessary modification to reflect changes, either directly or indirectly, caused by the response from the synthetic actor. Stated another way, the TAAM 106 may receive the response from the synthetic actor, and subject to the TAAM's assessment of the feasibility of the response (representing the rest of ATM), the TAAM may update the model. Any updates in TAAM may be reflected in the traffic visible to the DST, thus closing the loop shown in the closed-loop cycle at the operation 206 of FIG. 2.

Figure 5:
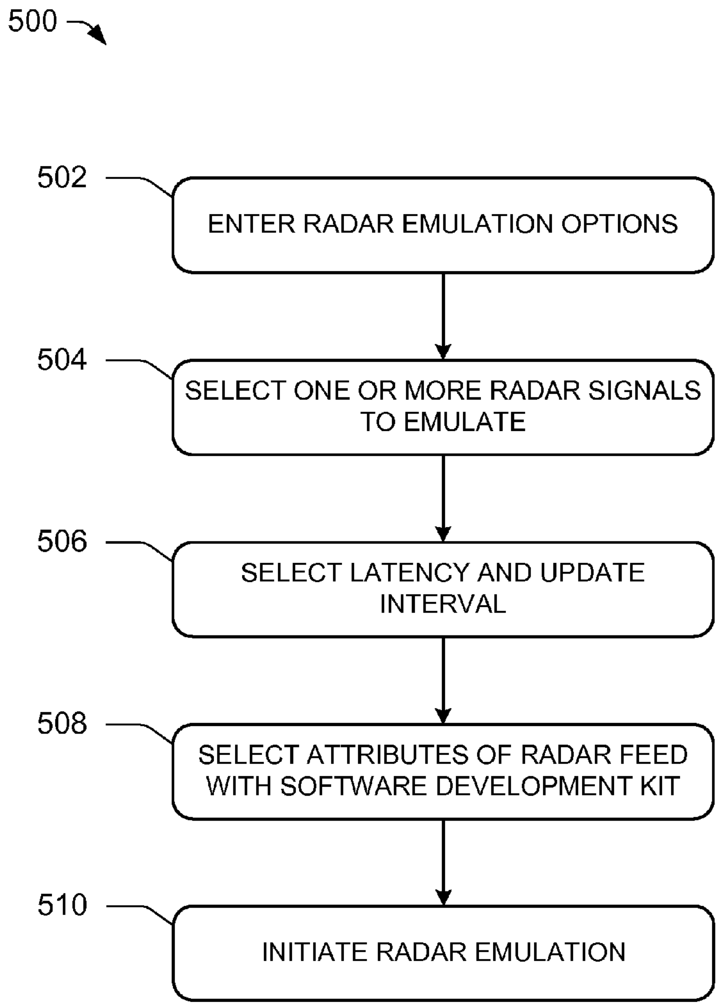
FIG. 5 shows a flow diagram of an illustrative process of providing a radar emulation in accordance with another embodiment of the disclosure.

FIG. 5 shows a flow diagram of an illustrative process 500 of providing a radar emulation in accordance with another embodiment of the disclosure. At 502, a user may initiate a radar emulation options selection. At 504, one or more radar signal types may be selected to be emulated by the SAFE gateway 108. For example, the TAAM may include a client application program interface (API) which outputs location information and other relevant information of the TAAM 106. The radar emulator may read output data from the TAAM 106 and may implement one or more types of radar signals directed to the DST 104. The radar signals outputted from the radar emulator and received by the DST may be indistinguishable from real-world radar signals.

At 506, the user may select a latency and an update interval for the radar signals. For example, the TAAM 106 may output data at a first frequency. The update interval for the radar signals may be set to a second frequency, which may be the same as the first frequency or may be at a lower frequency. In some embodiments, the interval for radar signals at the operation 506 may be determined by the clock synchronization in the operation 202 of FIG. 2. The radar emulator may include a time stamp to facilitate control of the second frequency and/or to either drive or align with the clock synchronization as described with reference to the operation 202.

In some embodiments, at 508, the user may select attributes of the radar feed. For example, the TAAM client API may include a software development kit (SDK) which may facilitate the construction of variants of the radar emulation to represent differing radar feed. The SAFE gateway 108 may manipulate a radar signal feed to observe any effects on the DST from problems with the feed including, but not limited to, message ordering, lag, scrambling. At 510, the radar emulation may be initiated by the SAFE gateway 108.

Figure 6:
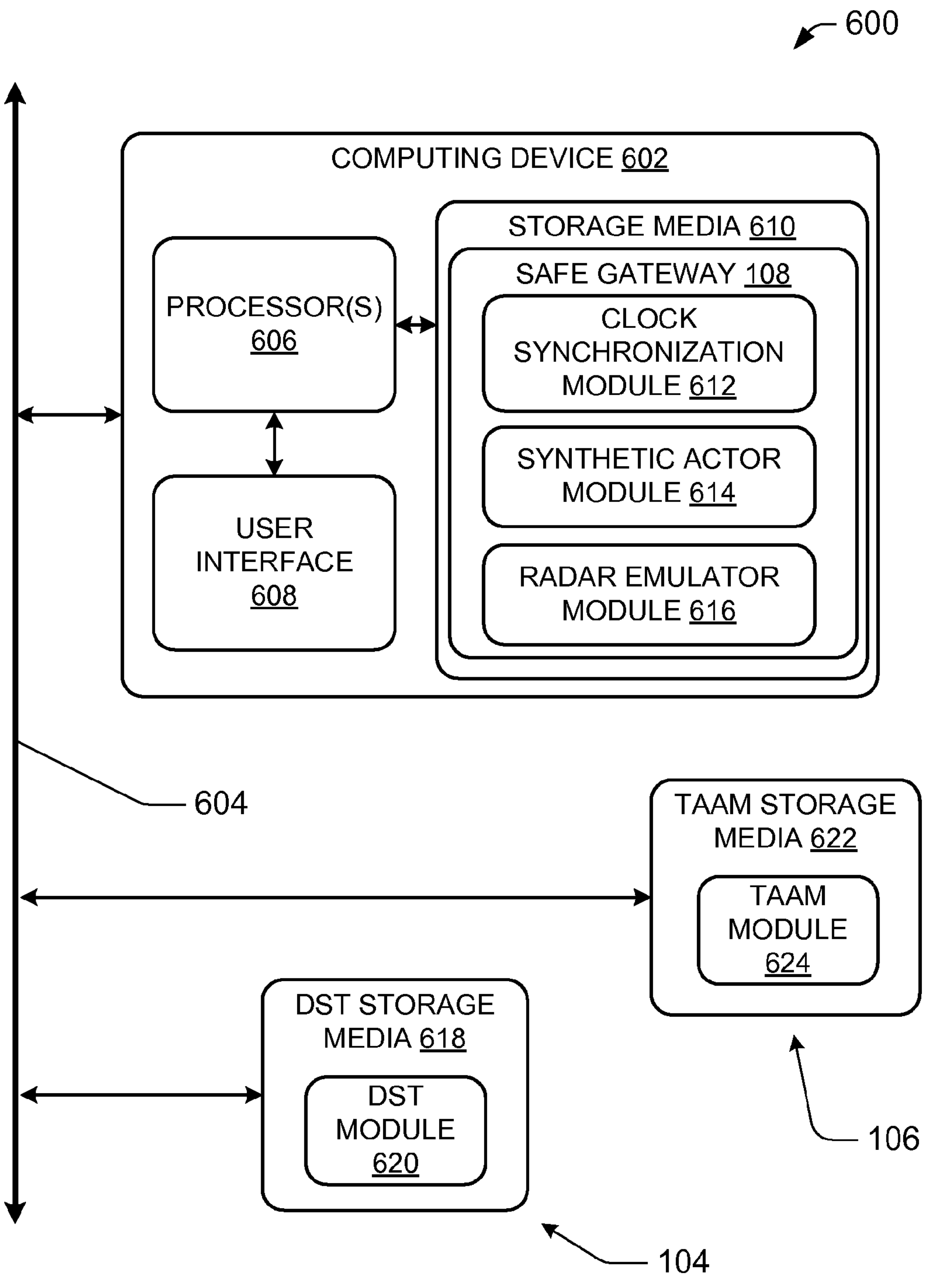
FIG. 6 is an illustrative computing environment for hosting a synthetic air traffic management fast-time environment, as illustrated in FIG. 1.

FIG. 6 is an illustrative computing environment 600 for hosting the synthetic air traffic management fast-time environment 100, as illustrated in FIG. 1. The environment 600 may include a computing device such as a server, desktop computer, laptop, or other computing device. The computing device 602 contains modules to perform the function of the SAFE gateway 108 as disclosed herein. As shown in the environment 600, the computing device 602 may be in communication with the TAAM 106 and the DST 104, each being hosted by one or more servers, via a network 604. In one or more embodiments, the computing device 602, the TAAM 106, and the DST 104 may be arranged on a single server, across multiple servers, or in other suitable arrangements to enable efficient processing of modules described herein. The network 604 may be wired or wireless and provide connectivity between the computing device 602 and the TAAM 106 and the DST 104. Wireless environments may include cellular, PCS, WIFI, Ultrawideband, Bluetooth, satellite transmission, and other equivalent wireless technologies. Although FIG. 6 depicts only one computing device 602, multiple computing devices may be used for in accordance with embodiments of the present disclosure.

The computing device 602 may include a number of components. The components may include one or more processors 606 that are coupled to instances of a user interface (UI) 608. The UI 608 represents any devices and related drivers that enable the computing device 602 to receive input from a user or other system, and to provide output to the user or other system. Thus, to receive inputs, the UI 608 may include keyboards or keypads, mouse devices, touch screens, microphones, speech recognition packages, imaging systems, or the like. Similarly, to provide outputs, the UI 608 may include speakers, display screens, printing mechanisms, or the like.

The computing device 602 may include one or more instances of a computer-readable storage media 610 that are addressable by the processor 606. As such, the processor 606 may read data or executable instructions from, or store data to, the storage media 610. The storage media 610 may contain the SAFE gateway 108, which may be implemented as one or more software modules that, when loaded into the processor 606 and executed, cause the computing device 602 to perform any of the functions described herein. Additionally, the storage media 610 may contain implementations of any of the various software modules described herein.

A clock synchronization module 612 may be implemented to provide the fast-time environment, which is described with reference to the operation 202 of FIG. 2. In some embodiments the clock synchronization module may use a time indicator, such as a time stamp from an existing source, such as the TAAM 106 or the DST 104. In other embodiments, the clock synchronization may drive the time indicator, such as providing a time stamp within the SAFE gateway 108.

A synthetic actor module 614 may facilitate providing the various functions of the synthetic actor, such as the functions described with reference to at least the operation 212 of FIG. 2, the process 300 of FIG. 3, and the operation 404 of FIG. 4. For example, the synthetic actor module 614 may receive a recommendation from the DST 104 and determine a response, such as implement the recommendation or portion thereof, reject the recommendation, or take another action. In addition, latency and/or errors may be included in the output of the synthetic actor module 614 to simulate a human actor, such as an ATM controller, a pilot, an airline operation center, or another entity.

A radar emulator module 616 may receive data from the TAAM 106, such as via a TAAM client API, and create a radar feed having one or more radar signals, which is transmitted to the DST 104. The radar emulator module 616 may provide functions such as those described with reference to at least the operation 208 of FIG. 2, the process 500 of FIG. 5.

The environment 600 may include the DST 104 having a DST storage media 618, which may host a DST module 620. Similarly, the TAAM 106 may have a TAAM storage media 622, which may host a TAAM module 624. The DST storage media 618 and the TAAM storage media 622 may be in communication with the computing device 602 via the network 604 to provide access by the SAFE gateway 108, such as to create architecture as represented in the environment 100 of FIG. 1. In some embodiments, the DST storage media 618 and/or the TAAM storage media 622 may be implemented on separate servers, on storage devices accessible by the computing device 602, or in other configurations. As configured in the environment 600, the SAFE gateway 108 may receive data from the DST module 620 and the TAAM module 624, which may enable a user to test, analyze, operate, determine reliability, or perform other related processes of the DST 104. In particular, a user may modify aspects of the SAFE gateway 108, such as the update interval and latency, to determine whether the DST manages the airspace simulation created by the airspace modeler within a predetermined operational threshold.

While preferred and alternate embodiments of the disclosure have been illustrated and described, as noted above, many changes can be made without departing from the spirit and scope of the disclosure. Accordingly, the scope of the disclosure is not limited by the disclosure of these preferred and alternate embodiments. Instead, the disclosure should be determined entirely by reference to the claims that follow.

What is claimed is:

1. A computer-based method of providing a closed-loop air traffic management simulation gateway between a decision support tool (DST) and an airspace modeler, the method comprising:

receiving, in the simulation gateway, one or more simulation parameters for clock synchronization;

receiving, in the simulation gateway, one or more configuration parameters for one or more synthetic actors;

receiving, in the simulation gateway, airspace simulation data from the airspace modeler, wherein the airspace simulation data is updated at a first frequency;

converting, in the simulation gateway, the airspace simulation data to emulated radar signals at an update interval at a second frequency, wherein the emulated radar signals comprise a time stamp to facilitate synchronizing the second frequency with the first frequency in accordance with the simulation parameters for clock synchronization;

transmitting the emulated radar signals from the simulation gateway to the DST for analysis;

receiving, in the simulation gateway, a recommendation from the decision support tool based on the emulated radar signals;

generating, in the simulation gateway, a synthetic actor response based on the recommendation and the one or more configuration parameters; and transmitting the synthetic actor response from the simulation gateway to the airspace modeler.

2. The method of claim 1, wherein the synthetic actor response includes a predetermined latency, wherein the predetermined latency includes one or more of a human response time, a human processing time, and an implementation time.

3. The method of claim 2, wherein at least one of the update interval and the predetermined latency is adjusted to determine whether the DST manages the airspace simulation data created by the airspace modeler within a predetermined operational threshold.

4. The method of claim 1, further including providing a clock synchronization to enable an accelerated fast-time analysis by the DST.

5. The method of claim 2, further comprising outputting an error message when the predetermined latency associated with the synthetic actor response exceeds a threshold.

6. The method of claim 1, wherein the one or more synthetic actors is representative of at least one of an aircraft pilot, an aircraft operational decision center, and an air traffic controller.

7. A computer-based system providing an air traffic management fast-time environment (SAFE) for evaluating airspace and procedure changes to an airspace route structure, the system comprising:

one or more processors;

a non-transitory computer readable storage media comprising logic instructions which, when executed by the one or more processors, configure the one or more processors to implement:

a decision support tool (DST) interface to interact with a DST module;

an airspace modeler interface to receive airspace simulation data from an airspace modeler module, wherein the airspace simulation data is updated at a first frequency; and a SAFE gateway to facilitate communications between the DST module and the airspace modeler module, the SAFE gateway including:

a radar emulator module to convert data received from the airspace modeler interface into radar signals for transmission to the DST interface, wherein the radar signals are generated at a second frequency and comprise a time stamp to facilitate synchronizing the second frequency with the first frequency in accordance with one or more simulation parameters for clock synchronization, and a synthetic actor module to receive one or more configuration parameters for one or more synthetic actors and a recommendation from the DST interface and provide a response to the airspace modeler interface.

8. The system of claim 7, wherein the non-transitory computer readable storage media further comprise logic instructions which, when executed by the one or more processors, configure the one or more processors to implement a clock synchronization module to enable accelerated processing of the DST module.

9. The system of claim 7, wherein the non-transitory computer readable storage media further comprise logic instructions which, when executed by the one or more processors, configure the one or more processors to implement an airspace modeler client application program interface which is configured to output standard data to a software development kit (SDK) to provide a plurality of radar signals for transmission to the DST module.

10. The system of claim 7, wherein the non-transitory computer readable storage media further comprise logic instructions which, when executed by the one or more processors, configure the one or more processors to provide a response that includes latency.

11. The system of claim 10, wherein the latency includes at least one of a fixed latency, a bounded random latency, and a variable latency based on the recommendation.

12. The system of claim 7, wherein the non-transitory computer readable storage media further comprise logic instructions which, when executed by the one or more processors, configure the one or more processors to convert data received from the airspace modeler interface into radar signals that include at least one of message ordering, a lag, and scrambling.

13. The system of claim 7, wherein the non-transitory computer readable storage media further comprise logic instructions which, when executed by the one or more processors, configure the one or more processors to output at least one of an error message, a conflict report, and an evaluation report.

14. A computer-based method of evaluating airspace and procedure changes to an airspace route structure, the method comprising:

providing a gateway between an airspace modeler and a decision support tool (DST);

receiving, in the gateway, one or more configuration parameters for one or more synthetic actors;

receiving, in the gateway, one or more simulation parameters for clock synchronization;

receiving airspace simulation data from the airspace modeler, wherein the airspace simulation data is updated at a first frequency;

converting, in the gateway, the airspace simulation data to emulated radar signals at an update interval at a second frequency, wherein the emulated radar signals comprise a time stamp to facilitate synchronizing the second frequency with the first frequency in accordance with the simulation parameters for clock synchronization;

transmitting the emulated radar signals from the gateway to the DST for analysis;

receiving a recommendation from the DST based on the emulated radar signals;

generating a response based on the recommendation and the one or more configuration parameters; and transmitting the response to the airspace modeler.

15. The method of claim 14, wherein transmitting the response to the airspace modeler includes providing latency to simulate human delay.

16. The method of claim 14, wherein generating the response based on the recommendation includes at least one of implementing at least a portion of the recommendation or rejecting the recommendation.

17. The method of claim 14, wherein transmitting the response to the airspace modeler includes:

transmitting a proposed response to the airspace modeler, and transmitting an alternative response when the proposed response is not accepted by the airspace modeler.

18. The method of claim 14, further comprising outputting at least one conflict generated by the airspace modeler based on the response.

19. The method of claim 14, further comprising determining when a latency associated with the response results in a stale recommendation, the stale recommendation being a recommendation that expires before the response is transmitted to the airspace modeler.

* * * * *